(12) United States Patent
Carrier et al.

(10) Patent No.: US 11,769,009 B2
(45) Date of Patent: Sep. 26, 2023

(54) USING DOMAIN SPECIFIC VOCABULARIES TO SPELLCHECK INPUT STRINGS

(71) Applicant: INTERNATIONAL BUSINESS MACHINES CORPORATION, Armonk, NY (US)

(72) Inventors: Scott Carrier, New Hill, CA (US); Brendan Bull, Durham, NC (US); Paul Lewis Felt, Springville, UT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 78 days.

(21) Appl. No.: 17/182,080

(22) Filed: Feb. 22, 2021

(65) Prior Publication Data
US 2022/0269857 A1 Aug. 25, 2022

(51) Int. Cl.
*G06F 40/232* (2020.01)
*G06F 21/31* (2013.01)
*G06F 40/169* (2020.01)
*G06F 40/284* (2020.01)

(52) U.S. Cl.
CPC .......... *G06F 40/232* (2020.01); *G06F 21/316* (2013.01); *G06F 40/169* (2020.01); *G06F 40/284* (2020.01)

(58) Field of Classification Search
CPC ..... G06F 40/232; G06F 40/284; G06F 40/169
See application file for complete search history.

(56) References Cited

U.S. PATENT DOCUMENTS

| 8,775,931 | B2 | 7/2014 | Fux et al. |
| 8,881,005 | B2 | 11/2014 | Al Badrashiny et al. |
| 9,529,863 | B1 | 12/2016 | Gindin et al. |
| 10,803,057 | B1 | 10/2020 | Goodsitt et al. |
| 2007/0016625 | A1 | 1/2007 | Berstis |
| 2010/0325539 | A1 | 12/2010 | Nedzlek et al. |
| 2011/0106617 | A1 | 5/2011 | Cooper et al. |
| 2015/0186355 | A1* | 7/2015 | Baldwin ............... G06F 40/232 704/9 |
| 2020/0020319 | A1* | 1/2020 | Malhotra ................ G10L 15/26 |

(Continued)

FOREIGN PATENT DOCUMENTS

WO 2014182820 A2 11/2014

OTHER PUBLICATIONS

Gupta, P., "A Context Sensitive Real-Time Spell Checker with Language Adaptability", arXiv:1910.11242v1, [cs.CL], Oct. 23, 2019, 7 pp.

*Primary Examiner* — Scott T Baderman
*Assistant Examiner* — Seung Woon Jung
(74) *Attorney, Agent, or Firm* — KONRAD RAYNES DAVDA & VICTOR LLP; David W. Victor (57) ABSTRACT

Provided are a computer program product, system, and method for using domain specific vocabularies to spellcheck input strings. A determination is made of a determining a domain specific vocabulary comprising domain specific tokens for a user. The input strings in the input text from the user are processed to determine whether the input strings match the domain specific tokens in the domain specific vocabulary. Indication is made that input strings that are determined to match the domain specific tokens in the domain specific vocabulary are not to be spellchecked by a global vocabulary available to users across domains.

16 Claims, 6 Drawing Sheets

(56) References Cited

U.S. PATENT DOCUMENTS

| | | | |
|---|---|---|---|
| 2021/0074277 A1* | 3/2021 | Lewis | G06F 3/013 |
| 2021/0365630 A1* | 11/2021 | Itani | G06F 3/0481 |
| 2022/0035799 A1* | 2/2022 | Bhutada | G06F 40/30 |
| 2022/0215170 A1* | 7/2022 | Yang | G06F 40/232 |

* cited by examiner

FIG. 1

Tenant Information

FIG. 2

Processed Input String Information

```
{
 "id": "I57",
 "cui": "I57",
 "preferredName": "Total Knee Replacement",
 "attributes": [ { "type": "Finding" } ],
 "surfaceForms": [
   { "text": "TKR" },
   { "text": "tkr" },
   { "text": "kne replacement" },
   { "text": "nee replacement" },
   { "text": "knee replacment" },
 ],
 "artifactVersion": "2018-03-05T09:22:46.906583Z"
},
```

USING DOMAIN SPECIFIC VOCABULARIES TO SPELLCHECK INPUT STRINGS

BACKGROUND OF THE INVENTION

1. Field of the Invention

The present invention relates to a computer program product, system, and method for using domain specific vocabularies to spellcheck input strings.

2. Description of the Related Art

Before text is provided to a Natural Language Processing (NLP) program to perform NLP processing of the text, the text may be subject to spellchecking. Spellchecking typically uses predefined vocabularies from which out-of-vocabulary tokens present in the input text are evaluated. The closest matching vocabulary entries for the out-of-vocabulary tokens are used as spell corrections of non-matching input strings.

There is a need in the art for improved techniques for providing spellchecking of input strings including spellchecking of input text before being processed by an NLP program.

SUMMARY

Provided are a computer program product, system, and method for using domain specific vocabularies to spellcheck input strings. A determination is made of a determining a domain specific vocabulary comprising domain specific tokens for a user. The input strings in the input text from the user are processed to determine whether the input strings match the domain specific tokens in the domain specific vocabulary. Indication is made that input strings that are determined to match the domain specific tokens in the domain specific vocabulary are not to be spellchecked by a global vocabulary available to users across domains.

DETAILED DESCRIPTION

In the current NLP processing, tokens present within user-provided artifacts such as dictionaries and rule-based configurations are omitted from the out-of-the-box or global spellcheck vocabularies. Some of these user provided artifacts, including dictionaries, may also include regular expression (regex) patterns, may also be omitted from the global spellcheck vocabulary. These omissions from the spellcheck vocabulary result in terms that are known and understood by the consumer being misconstrued as misspellings, which are then "corrected" to the closest matching term in the provided spellcheck vocabulary. Consequently, terms that would otherwise be picked up by the custom dictionary and other NLP assets are not found (false negatives).

Described embodiments provide improvements to spellchecking computer technology by providing different domain specific vocabularies for different tenants in a multitenant system to build an NLP service for a user to include the domain specific vocabularies assigned to the tenant associated with the user. This allows for domain specific regular expressions, tokens, and phrases to be first spellchecked against the input text to ensure spellchecking first uses the domain specific vocabulary before considering the global vocabulary. The term token as used herein can refer to a string comprising one word or a phrase of words, or a stem of a word. This allows for domain specific vocabularies across a set of NLP services to augment the general or global vocabulary to prevent corrections from the global vocabulary of terms that are correct in a specific domain. Described embodiments further provide domain specific regular expressions used to annotate terms having a pattern that matches a pattern of the domain specific regular expression with an ignore semantic type so they are not spellchecked by the global vocabulary. In yet further embodiments, NLP annotators may process corrected terms to determine if the pre-corrected terms can yield meaningful annotations and metadata from the NLP annotators for the NLP processing. Those pre-corrected terms useful to the NLP annotators may be retained in the spellcheck output to replace the spellchecked corrected terms because the resulting meaningful NLP annotations indicate the pre-corrected terms were correct within the domain specific usage.

Figure 1:
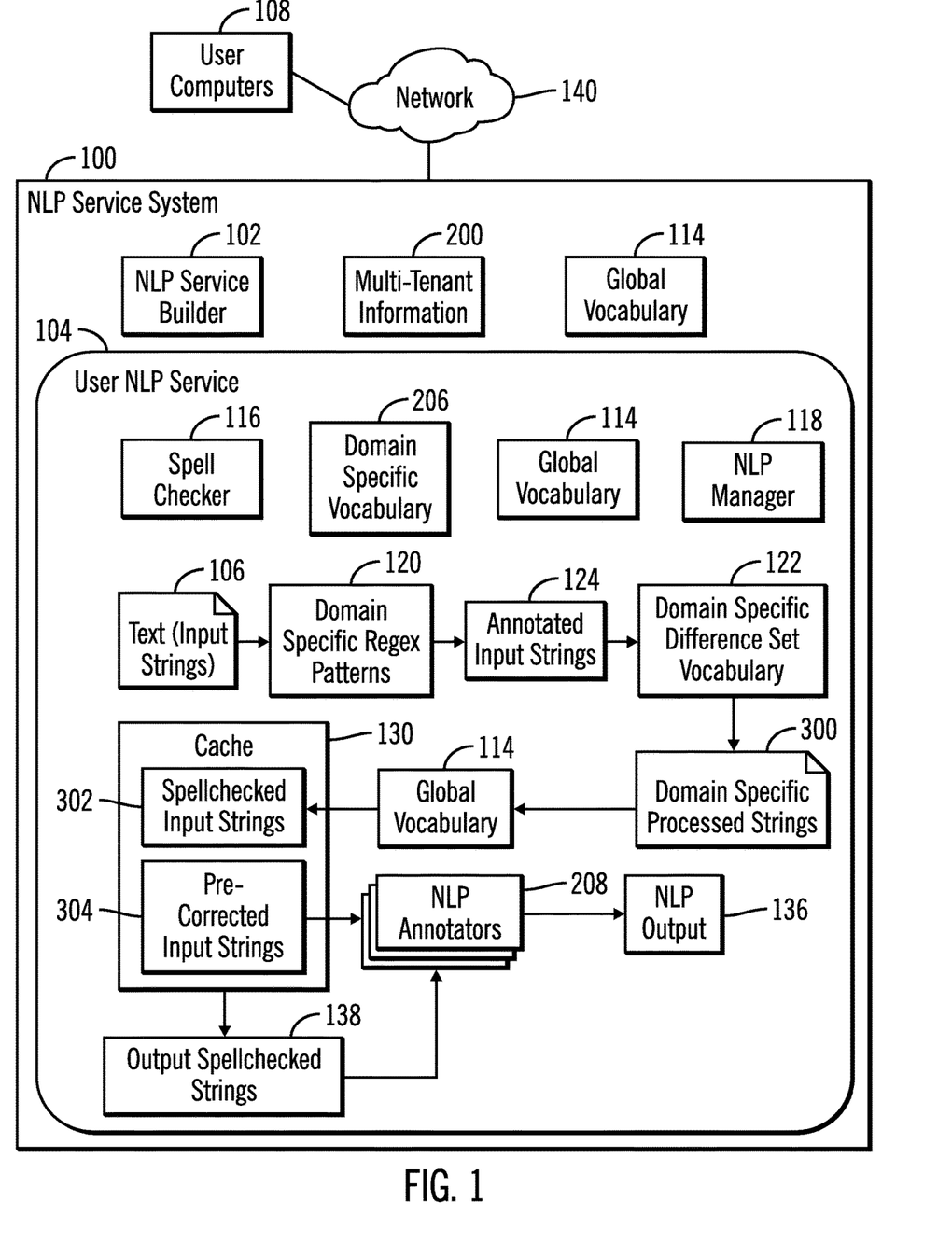
FIG. 1 illustrates an embodiment of a natural language processing (NLP) service system to generate user NLP services.

FIG. 1 illustrates an embodiment of a natural language processing (NLP) service system 100 having an NLP service builder 102 to create an user NLP service 104 for an authenticated user at a user computer 108 to provide NLP processing of user input text 106. The NLP service system 100 maintains multi-tenant information 200 (FIG. 2) having domain specific vocabularies 206 and domain specific NLP annotators 208 to deploy in the user NLP service 104 for a tenant of which the requesting user is associated. The NLP service system 100 further includes global vocabularies 114 deployed in the user NLP services 104 for all users across domains and tenants. The NLP service builder 112 further deploys in the user NLP service 104 a spellchecker 116 to manage spellchecking of the input text 106 and an NLP manager 118 to manage NLP processing of the spellchecked text 106.

A domain specific vocabulary 206 may include domain specific regular expression (REGEX) patterns 120 and domain specific tokens and surface forms for a specific domain, such as an area of medicine, science, law, finance, economics, social science, etc. The spellchecker 116 or NLP service builder 102 may generate for the NLP service 104 a domain specific difference set vocabulary 122 comprising domain specific tokens, surface forms, and phrases not found in the global vocabulary 114. The spell checker 116 may process the text input strings 106 using the domain specific regular expression (regex) patterns 120 to annotate matching patterns with an ignore syntax type to produce annotated input strings 124. The spellchecker 116 processes the annotated input strings 124 to match with tokens, surface forms, and phrases in the domain specific difference set vocabulary 122 to produce domain specific processed strings 302, comprising input strings 106 corrected by the domain specific difference set vocabulary 122 or found to match or not match tokens and phrases in the domain specific difference set vocabulary 122.

The spellchecker 116 may then spellcheck the domain specific processed strings 302 that were not corrected or not found to match domain specific difference set vocabulary 122 strings with the global vocabulary 114 to produce the spellchecked input strings 126 in a cache 130 in memory assigned to the user NLP service 104. The cache 130 further maintains pre-corrected input strings 304 for those corrected input strings in the spellchecked input strings 302. The spell checker 116 may determine whether to replace corrected input strings with pre-corrected input strings 304 based on whether the NLP annotators 134 provide meaningful NLP output 136 comprising annotations and metadata for the pre-corrected strings 302. If meaningful NLP output 136 is provided for pre-corrected strings 302, then the corrected strings in the spellchecked input strings 302 may be replaced by pre-corrected strings 304. Meaningful NLP output 136, such as metadata and annotations, indicates the pre-corrected strings 304 provide useful information and are likely correct because the NLP annotators 208 are able to generate meaningful NLP annotations from the pre-corrected strings 304. The resulting output spellchecked strings 138 comprises input strings 106 matching domain specific regex patterns 120, matching domain specific tokens, surface forms and phrases, corrected to domain specific tokens and phrases, matching and corrected according to the global vocabulary 114, and replaced by pre-corrected input strings 132. The NLP manager 118 may then provide the final output spellchecked strings 138 to the NLP annotators 208 for NLP processing of the output spellchecked strings 138.

In certain implementations, the domain specific 206 and global 114 vocabularies may be a white box, such as in plain text form, where the tokens and regular expression patterns 120 are accessible so the domain specific difference set vocabulary 122 may be determined. In other implementations, the domain specific vocabulary 206 may comprise a black box, such as in a binary format, e.g., object code, executable code, or other machine readable code, and the tokens and regular expression patterns 120 are inaccessible for extraction. In embodiments where the domain specific vocabulary 206 is in a black box format, then the NLP annotators 208 may be used to determine whether to retain pre-corrected input strings 304.

Generally, program modules, such as the program components 102, 116, 114, 118, 120, 206, 208 may comprise routines, programs, objects, components, logic, data structures, and so on that perform particular tasks or implement particular abstract data types. The program components and hardware devices of the NLP service system 100 of FIG. 1 may be implemented in one or more computer systems, where if they are implemented in multiple computer systems, then the computer systems may communicate over a network The programs 102, 116, 118, 208 may comprise program code loaded into memory and executed by a processor. Alternatively, some or all of the functions may be implemented in hardware devices, such as in Application Specific Integrated Circuits (ASICs) or executed by separate dedicated processors.

In FIG. 1, arrows are shown between components in the user NLP service 104. These arrows represent information flow to and from the program components and do not represent data structures in the user NLP service 104.

The user computers 108 may communicate with the NLP service system 100 over a network 140 to request the NLP service system 100 to provide a user NLP service 104 for the users at the user computers 108 to use to perform NLP processing for the users.

The network 140 may comprise a Storage Area Network (SAN), Local Area Network (LAN), Intranet, the Internet, Wide Area Network (WAN), peer-to-peer network, wireless network, arbitrated loop network, etc.

Figure 2:
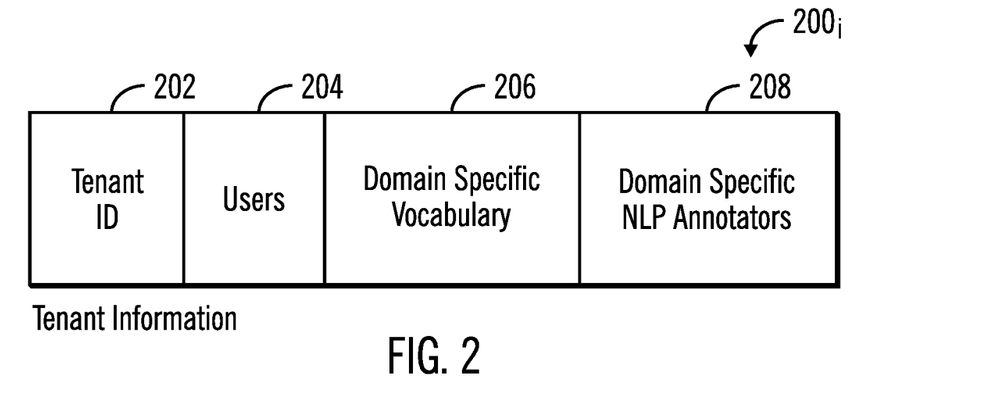
FIG. 2 illustrates an embodiment of tenant information providing domain specific vocabularies for a tenant.

FIG. 2 illustrates an embodiment of tenant information $200_i$ for one tenant in the multi-tenant information 200, and includes: a tenant identifier 202; users associated with the tenant 204; domain specific vocabularies 206 provided for the tenant 202, including domain specific tokens, regular expressions, surface forms, phrases, etc.; and domain specific NLP annotators 208 provided for the tenant 202. The NLP annotators 208 may further include NLP annotators used across domains and tenants.

With the embodiment of FIG. 2, the NLP service system 100 may provide domain specific vocabularies 206 and NLP annotators 208 to deploy in user NLP services 104 for users associated with a tenant 200k. Users may be members of a client that comprises an organization that has subscribed to the NLP services offered by the NLP service system 100 in a multi-tenancy NLP service system 100. A client may have various sub-units or divisions referred to as tenants, each having different and specific NLP service needs, including domain specific vocabularies and NLP annotators. The client may arrange to have one or more domain specific vocabularies and LP annotators assigned to the tenants of the client to provide NLP services storage for the client tenants. The client may further register users of the client to be associated with the NLP services for tenants, where a registered user may be a member or associated with a tenant of the client and NLP services of the tenant. The configuration of clients, tenants, NLP services, and users may be represented in the multi-tenant information 200.

Figure 3:
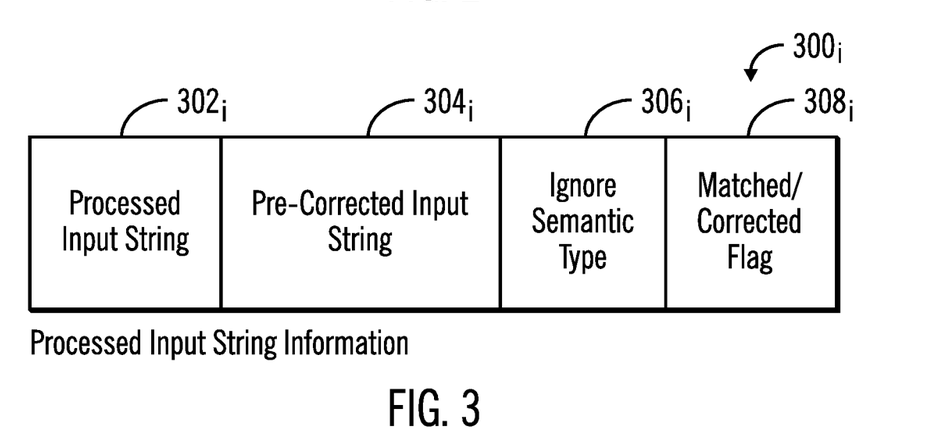
FIG. 3 illustrates an embodiment of processed input string information.

FIG. 3 illustrates an embodiment of information 300, maintained for an input string 106 processed by the domain specific different set vocabulary 122 or global vocabulary 114 as including the processed input string $302_i$, a pre-corrected input string 304, stored in the cache 130 if the input string $302_i$ was corrected; an ignore semantic type 306, if the input string $302_i$ matched one of the domain specific regex patterns 120, and a match/corrected flag $308_i$ if the processed input string $302_i$ matched or was corrected according to a token, phrase or surface form in the domain specific different set vocabulary 122. If corrected, the processed input string $302_i$ comprises the corrected input string.

Figure 4:
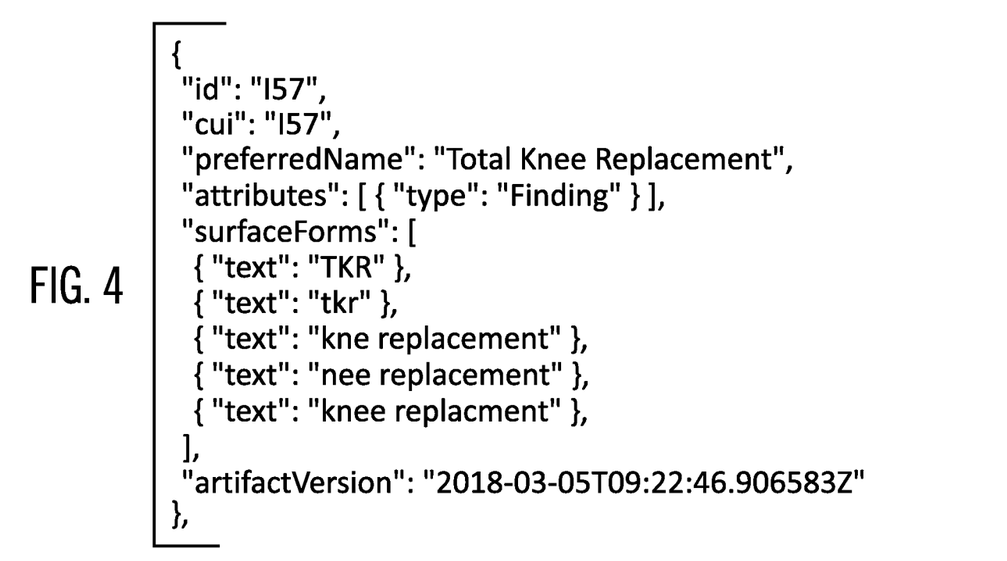
FIG. 4 illustrates an example of a domain specific phrase and surface forms in accordance with embodiments.

FIG. 4 provides an example of tokens and surface forms for a phrase in the domain specific vocabulary 110. The phrase comprises "Total Knee replacement", and the text to search for in the input strings comprises surface forms for this phrase. A match of the surface forms would result in correction to the preferred name of the phrase.

Figure 5:
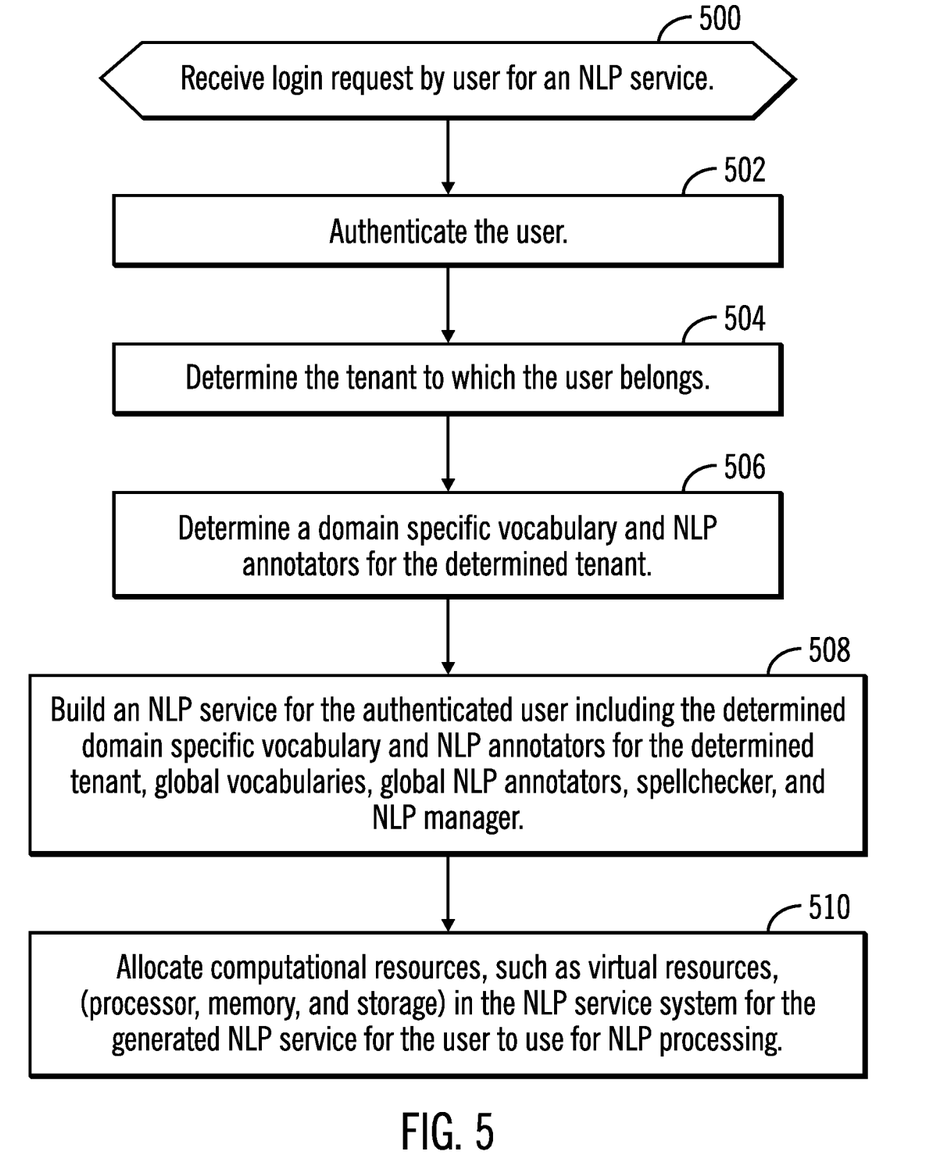
FIG. 5 illustrates an embodiment of operations to build a user NLP service with a domain specific vocabulary.

FIG. 5 illustrates an embodiment of operations performed by the NLP service builder 102 to generate a user NLP service 104 for a user. Upon receiving (at block 500) a login request by a user for an NLP service from a user computer 108, the NLP service builder 102 authenticates (at block 502) the user and determines (at block 504) a tenant 200, to which the user belongs. The builder 102 determines (at block 506) a domain specific vocabulary 206 and domain specific NLP annotators 208 for the determined tenant. A user NLP service 104 is built (at block 508) for the authenticated user including the determined domain specific vocabulary 206 NLP and annotators 208 for the determined tenant, global vocabulary 114, global NLP annotators 208, a spell checker program 116, and NLP manager 118. The NLP builder 102 may further allocate (at block 510) computational resources, such as virtual computational resources, e.g., processor, memory, and storage, in the NLP service system 100 for the generated user NLP servicer 104 for the user to use for NLP processing.

With the embodiment of FIG. 5, the NLP service system 100 provides different domain specific vocabularies and NLP annotators to include in a user NLP service 104 build for users assigned to different tenants in a multi-tenant service system. This allows the NLP service system 100 to tailor the vocabularies provided to a user for the domain specific environment in which the user operates.

Figure 6:
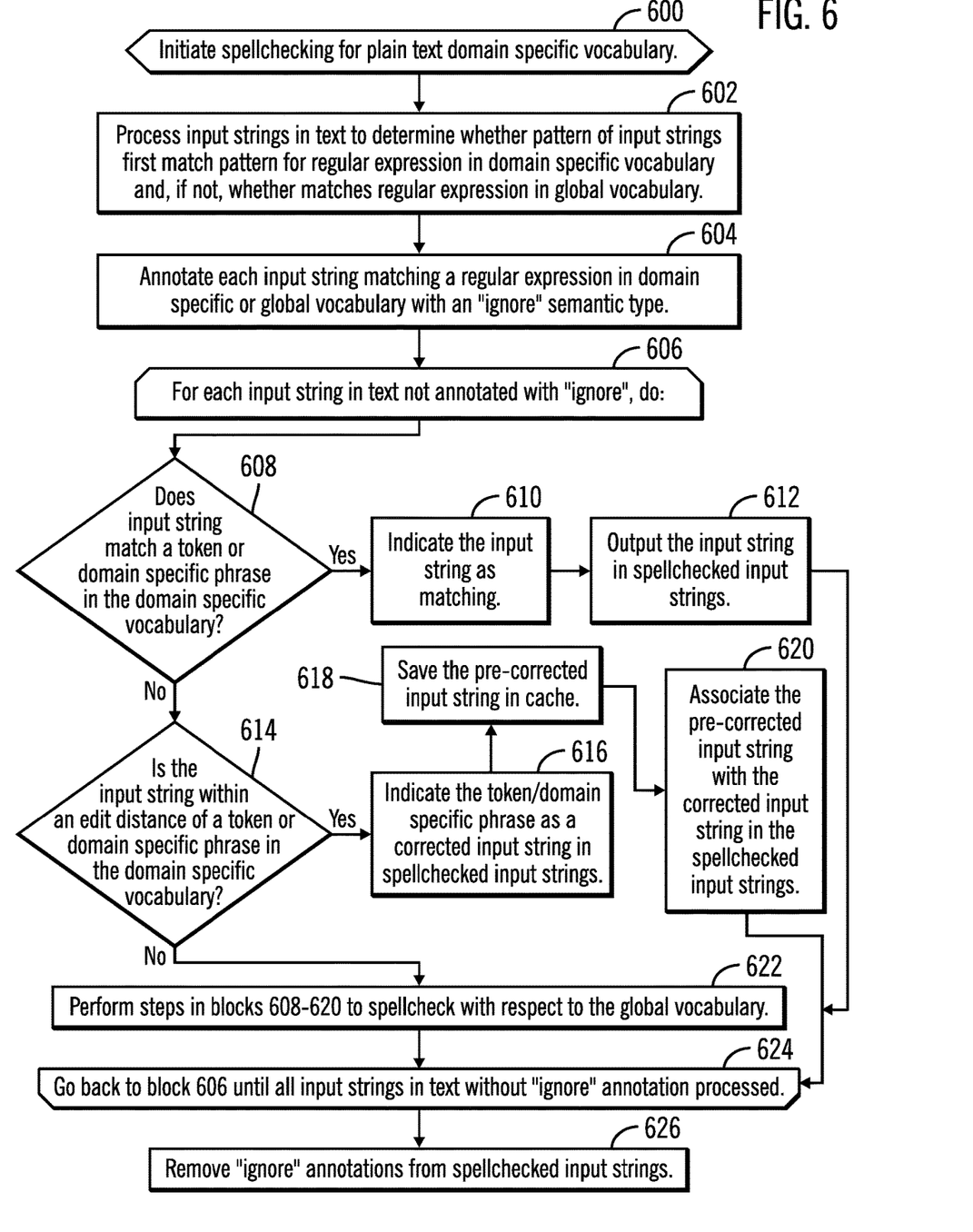
FIG. 6 illustrates an embodiment of operations to spellcheck input strings in text using a domain specific vocabulary.

FIG. 6 illustrates an embodiment of operations performed by the spellchecker 116 to perform spellchecking of input strings. Upon initiating (at block 600) spellchecking, the spellchecker 116 processes (at block 602) input strings 106 in text to determine whether a pattern of the input strings 106 matches a pattern of a regular expression (regex) in the domain specific vocabulary 206 and, if not, whether the input string 106 matches a regular expression in the global vocabulary 114. Each input string matching a regular expression in domain specific vocabulary 206 or the global vocabulary 114 is annotated (at block 604) with an "ignore" semantic type 306i to output annotated input strings 124. The spellchecker 116 performs a loop of operations at blocks 606 through 624 for each input string 106 in the text not annotated with the ignore semantic type 306i, where an input string may comprise one or more words. If (at block 606) the input string 106 matches a token or domain specific phrase in the domain specific vocabulary 206, then the input string 106 comprises a processed input string 302i that is indicated (at block 610) as matched 308i and the input string 302i is outputted (at block 612) in the spellchecked input strings 302.

If (at block 608) the input string 300 does not match a token or domain specific phrase, then a determination is made (at block 614) as to whether the input string 300 is within an edit distance, e.g., a Damerau-Levenshtein distance, etc., of a token or domain specific phrase in the domain specific vocabulary 206. If so, the token/domain specific phrase within the edit distance is indicated (at block 616) as a corrected input string 308i for the processed input string 302i in the spellchecked input strings 302 and the pre-corrected input string 304i is saved (at block 618) in the cache 130 for the processed input string 302i. The pre-corrected input string 304i is associated (at block 620) with the corrected input string 302i in the processed input string information 300i. If (at block 614) the input string is not within an edit distance of a token or phrase in the domain specific vocabulary 206, then the spellchecker 116 performs the operations in blocks 608- 620 to spellcheck with respect to the global vocabulary 114. After all the input strings are processed, the ignore annotations 306i may be removed (at block 626) from the text. Alternatively, the ignore annotations 306i may be retained for audit, tracing, and debugging purposes.

In an alternative embodiment of FIG. 6, the regex patterns may be applied to input strings not identified in one of the vocabularies 206, 114, as opposed to applying the regex patterns before spellchecking with the vocabularies 206, 114.

The result of the operations of FIG. 6 are output spellchecked strings 138, spellchecked with a domain specific vocabulary 206 and a global vocabulary 114.

Figure 7:
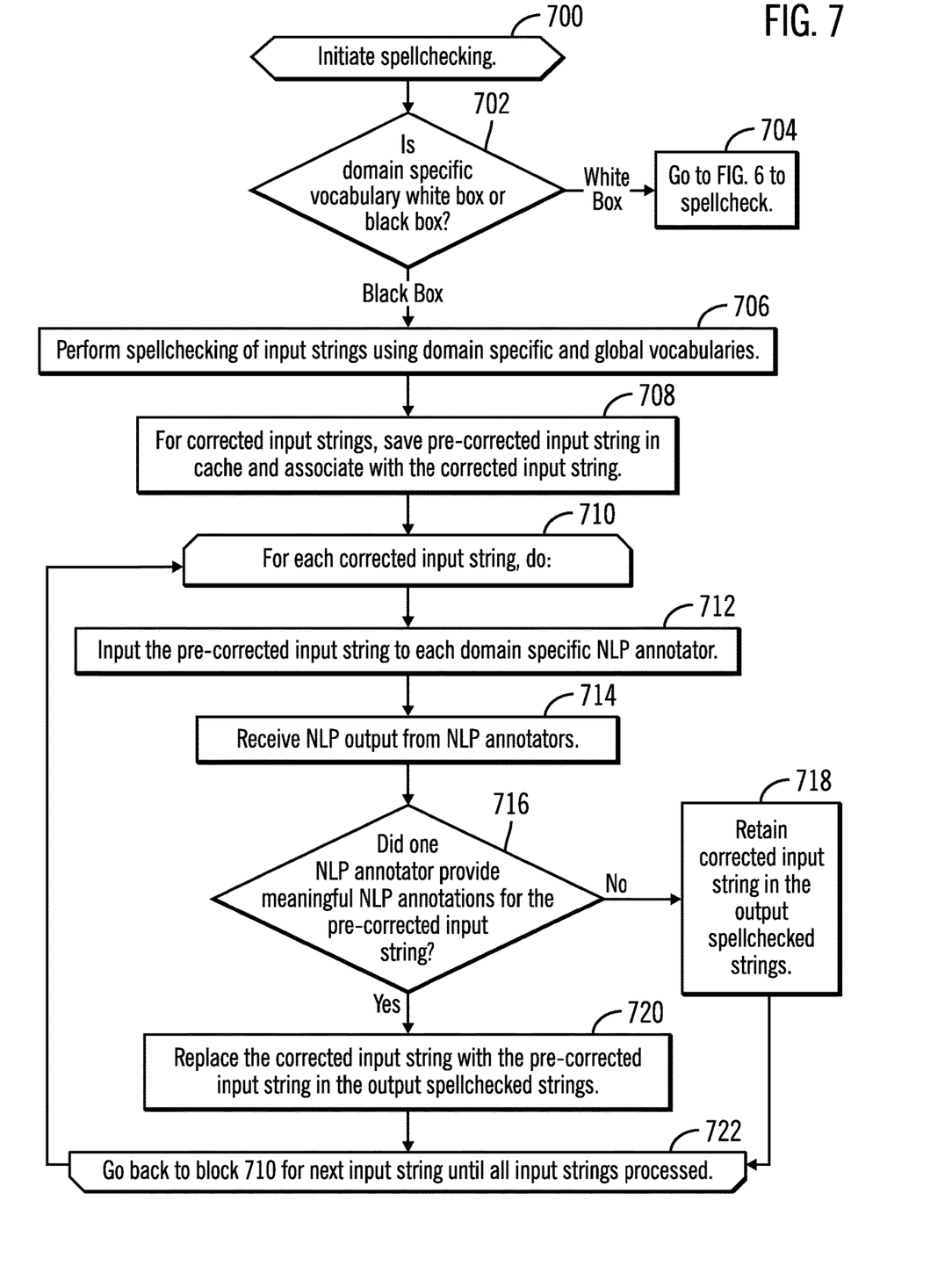
FIG. 7 illustrates an embodiment of operations to use NLP annotators to provide feedback on spellcheck corrections to determine whether to use the pre-corrected input string.

FIG. 7 illustrates an alternative embodiment of operations performed by the spellchecker 116 or other component, such as the NLP manager 118, to determine whether input strings 302 should be corrected directly using extracted domain specific regex patterns 120 and the domain specific difference set vocabulary 122 extracted from the domain specific vocabulary 206, which is in a white box format, e.g., plain text, or whether the domain specific vocabulary is in a black box format, e.g., a binary format, and the NLP annotators 208 should be used to determine whether to use the black box corrections. Upon initiating spellchecking (at block 700), if the domain specific vocabulary 206 is in a white box format, e.g., plain text, then control proceeds to FIG. 6 to perform the spellchecking. If (at block 702) the domain specific vocabulary 206 is in a black box format, e.g., a binary format, then control proceeds to blocks 706 et seq. to use the NLP annotators 208 to determine whether input strings corrected by the spellcheck program 116 and the black box vocabularies 114, 206 should be replaced by the pre-corrected input string 304 because the pre-corrected form provides useful information to the NLP annotators 208.

The spellchecker 116 (at block 706) calls the black box domain specific 206 and global 114 vocabularies to spellcheck the input strings 106. For each corrected input string $302_i$, the pre-corrected input string $304_i$ is saved (at block 708) in the cache 130 for the processed input string $302_i$ and the pre-corrected input string $304_i$ is associated with the corrected input string $302_i$ in the processed input string information $300_i$. At blocks 710 through 722 a loop of operations is performed for each corrected processed input string 3021 having a pre-corrected input string $304_i$. The pre-corrected input string $304_i$ is inputted (at block 712) into each NLP annotator 208, including the domain specific NLP annotators 208, and NLP output 136 is received (at block 714) from the NLP annotators 208. If (at block 716) one of the NLP annotators 208 provided meaningful NLP annotations for the pre-corrected input string $304_i$, then the corrected input string $304_i$ for the spellchecked input string $302_i$ is replaced (at block 720) with the pre-corrected input string $304_i$ in the output spellchecked strings 138. If (at block 716) one of the NLP annotators 208 did not provide meaningful annotations in the NLP output 136, then the corrected input string 302k is retained (at block 718) in the output spellchecked strings 138.

With the embodiment of FIG. 7, if the domain specific vocabulary 206 is in a black box format so the tokens and regular expression patterns 120 are inaccessible, then the spellchecked input strings 302 are processed to determine if the pre-corrected input strings 304 result in meaningful NLP annotations to determine whether to use the pre-corrected input string 304 instead of the corrected input string 302. In this way, the NLP annotators 208 are used to provide feedback to the spellchecker 116 to determine whether the pre-corrected input string $304_i$ should be retained because they provide useful information to the NLP annotators and NLP processing. The final output spellchecked strings 138 may then be inputted to the NLP annotators 208 for NLP processing.

In a further embodiment, the NLP annotator 208 correction operations at blocks 710 through 720 may be performed after the white box spellchecking operations of FIG. 6 are performed to further determine whether pre-corrected input strings 304 should be retained in output spellchecked strings 138.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
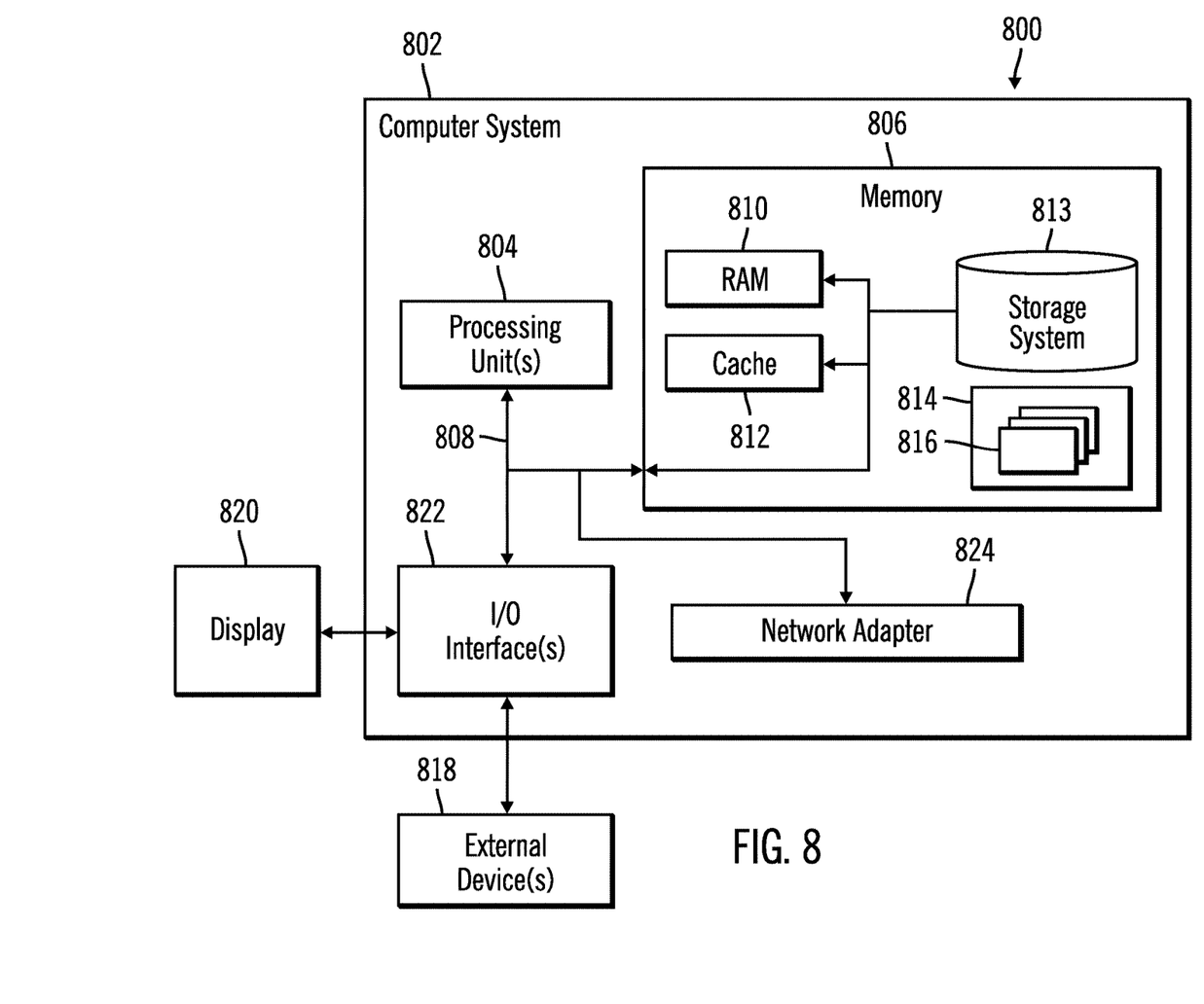
FIG. 8 depicts a computing environment in which the components of FIG. 1 may be implemented.

The computational components of FIG. 1, including NLP service system 100 and user computers 108, may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to, microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for spellchecking input text from a user, wherein the computer program product comprises a computer readable storage medium having computer readable program instructions executed by a processor to perform operations, the operations comprising:
   determining a domain specific vocabulary comprising domain specific tokens for the user and regular expressions having patterns of acceptable strings in the domain specific vocabulary;
   determining input strings having a pattern matching one of the patterns of the regular expressions;
   annotating the determined input strings having the pattern matching one of the patterns of the regular expressions with an ignore semantic type;
   processing input strings in the input text, not annotated with the ignore semantic type, to determine whether the input strings match the domain specific tokens in the domain specific vocabulary;
   indicating that input strings that are determined to match the domain specific tokens in the domain specific vocabulary as domain matching input strings;
   applying a global vocabulary available to users across domains to spell check input sptrings not annotated with the ignore semantic type and that are not found to match or not corrected with the domain specific vocabulary; and
   outputting the domain matching input strings, the input strings annotated with the ignore semantic type, and the input strings spellchecked by the global vocabulary in spellchecked strings.

2. The computer program product of claim 1, wherein the operations further comprise:
   determining whether input strings that do not match the domain specific tokens in the domain specific vocabulary are within a correctible distance from the domain specific tokens in the domain specific vocabulary;
   correcting the input strings to domain specific tokens in the domain specific vocabulary that are within the correctible distance; and
   indicating that input strings that are corrected to the domain specific tokens in the domain specific vocabulary are not to be spellchecked by the global vocabulary.

3. The computer program product of claim 2, wherein the domain specific tokens comprise phrases of multiple words and single words.

4. The computer program product of claim 1, wherein the operations further comprise:
   providing multi-tenancy information for a plurality of tenants assigned to clients, wherein, for each tenant of the tenants, the multi-tenancy information indicates users assigned to the tenant, a domain specific vocabulary comprising domain specific tokens assigned to the tenant, wherein the determining the domain specific vocabulary for an authenticated user comprises:
   determining a tenant to which the user is assigned; and
   determining a domain specific vocabulary for the determined tenant, wherein the determined domain specific vocabulary used to correct the input strings for the authenticated user comprises the domain specific vocabulary determined for the determined tenant.

5. The computer program product of claim 1, wherein in response to authenticating the user the operations further comprise:
   building a natural language processing (NLP) service for the user in which the domain specific vocabulary, a spellchecker, NLP annotators, and an NLP manager are deployed; and
   allocating computational resources for the NLP service for use by the user.

6. The computer program product of claim 1, wherein the operations further comprise:
   comparing the domain specific vocabulary with the global vocabulary to generate a domain specific difference set of domain specific tokens in the domain specific vocabulary not included in the global vocabulary, and
   determining whether the input strings match any domain specific tokens in the domain specific difference set, wherein the input strings indicated to not be spellchecked against the global vocabulary comprise the input strings matching domain specific tokens in the domain specific difference set.

7. The computer program product of claim 1, wherein the operations further comprise:
   caching a pre-corrected input string before an input string is corrected by spellchecking to produce a corrected input string;
   providing the pre-corrected input string to a natural language processing (NLP) annotator to process to produce metadata output on the pre-corrected input string;
   determining whether the NLP annotator outputted NLP annotations for the pre-corrected input string; and
   replacing the corrected input string with the pre-corrected input string in spellchecked strings in response to determining that the NLP annotator outputted NLP annotations for the pre- corrected input string.

8. The computer program product of claim 7, wherein the operations further comprise: determining whether the domain specific vocabulary is in a white box format or a black box format; extracting the domain specific tokens from the domain specific vocabulary to use in the processing of the input strings in response to determining that the domain specific vocabulary is in the white box format; and in response to determining that the domain specific vocabulary is in the black box format, performing the spellchecking using the domain specific vocabulary, wherein the operations of the caching the pre-corrected input string, the providing the pre-corrected input string to the NLP annotator, the determining whether the NLP annotator outputted NLP annotations, replacing the corrected input string, and the providing the pre- corrected input string to the NLP annotator are performed after the spellchecking using the domain specific vocabulary in the black box format.

9. A system for spellchecking input text from a user, comprising: a processor; and a computer readable storage medium having computer readable program instructions executed by a processor to perform operations, the operations comprising:
   determining a domain specific vocabulary comprising domain specific tokens for the user and regular expressions having patterns of acceptable strings in the domain specific vocabulary;
   determining input strings having a pattern matching one of the patterns of the regular expressions;
   annotating the determined input strings having the pattern matching one of the patterns of the regular expressions with an ignore semantic type;

processing input strings in the input text not annotated with the ignore semantic type, to determine whether the input strings match the domain specific tokens in the domain specific vocabulary;

indicating that input strings that are determined to match the domain specific tokens in the domain specific vocabulary as domain matching input strings;

applying a global vocabulary available to users across domains to spell check input strings not annotated with the ignore semantic type and that are not found to match or not corrected with the domain specific vocabulary; and outputting the domain matching input strings, the input strings annotated with the ignore semantic type, and the input strings spellchecked by the global vocabulary in spellchecked strings.

10. The system of claim 9, wherein the operations further comprise:

determining whether input strings that do not match the domain specific tokens in the domain specific vocabulary are within a correctible distance from the domain specific tokens in the domain specific vocabulary;

correcting the input strings to domain specific tokens in the domain specific vocabulary that are within the correctible distance; and indicating that input strings that are corrected to the domain specific tokens in the domain specific vocabulary are not to be spellchecked by the global vocabulary.

11. The system of claim 9, wherein the operations further comprise:

providing multi-tenancy information for a plurality of tenants assigned to clients, wherein, for each tenant of the tenants, the multi-tenancy information indicates users assigned to the tenant, a domain specific vocabulary comprising domain specific tokens assigned to the tenant, wherein the determining the domain specific vocabulary for an authenticated user comprises:

determining a tenant to which the user is assigned; and determining a domain specific vocabulary for the determined tenant, wherein the determined domain specific vocabulary used to correct the input strings for the authenticated user comprises the domain specific vocabulary determined for the determined tenant.

12. The system of claim 9, wherein the operations further comprise:

caching a pre-corrected input string before an input string is corrected by spellchecking to produce a corrected input string;

providing the pre-corrected input string to a natural language processing (NLP) annotator to process to produce metadata output on the pre-corrected input string;

determining whether the NLP annotator outputted NLP annotations for the pre-corrected input string; and replacing the corrected input string with the pre-corrected input string in spellchecked strings in response to determining that the NLP annotator outputted NLP annotations for the pre- corrected input string.

13. A method for spellchecking input text from a user, comprising:

determining a domain specific vocabulary comprising domain specific tokens for the user and regular expressions having patterns of acceptable strings in the domain specific vocabulary;

determining input strings having a pattern matching one of the patterns of the regular expressions;

annotating the determined input strings having the pattern matching one of the patterns of the regular expressions with an ignore semantic type;

processing input strings in the input text, not annotated with the ignore semantic type, to determine whether the input strings match the domain specific tokens in the domain specific vocabulary;

indicating that input strings that are determined to match the domain specific tokens in the domain specific vocabulary as domain matching input strings;

applying a global vocabulary available to users across domains to spell check input strings not annotated with the ignore semantic type and that are not found to match or not corrected with the domain specific vocabulary; and outputting the domain matching input strings, the input strings annotated with the ignore semantic type, and the input strings spellchecked by the global vocabulary in spellchecked strings.

14. The method of claim 13, further comprising:

determining whether input strings that do not match the domain specific tokens in the domain specific vocabulary are within a correctible distance from the domain specific tokens in the domain specific vocabulary;

correcting the input strings to domain specific tokens in the domain specific vocabulary that are within the correctible distance; and indicating that input strings that are corrected to the domain specific tokens in the domain specific vocabulary are not to be spellchecked by the global vocabulary.

15. The method of claim 13, further comprising:

providing multi-tenancy information for a plurality of tenants assigned to clients, wherein, for each tenant of the tenants, the multi-tenancy information indicates users assigned to the tenant, a domain specific vocabulary comprising domain specific tokens assigned to the tenant, wherein the determining the domain specific vocabulary for an authenticated user comprises:

determining a tenant to which the user is assigned; and determining a domain specific vocabulary for the determined tenant, wherein the determined domain specific vocabulary used to correct the input strings for the authenticated user comprises the domain specific vocabulary determined for the determined tenant.

16. The method of claim 13, further comprising:

caching a pre-corrected input string before an input string is corrected by spellchecking to produce a corrected input string;

providing the pre-corrected input string to a natural language processing (NLP) annotator to process to produce metadata output on the pre-corrected input string;

determining whether the NLP annotator outputted NLP annotations for the pre-corrected input string; and replacing the corrected input string with the pre-corrected input string in spellchecked strings in response to determining that the NLP annotator outputted NLP annotations for the pre- corrected input string.

* * * * *